US011457603B2

(12) United States Patent
Torres (10) Patent No.: US 11,457,603 B2
(45) Date of Patent: *Oct. 4, 2022

(54) COLLAPSIBLE PET CARRIER (71) Applicant: Laura Torres, New York, NY (US)

(72) Inventor: Laura Torres, New York, NY (US)

( * ) Notice: Subject to any disclaimer, the term of this patent is extended or adjusted under 35 U.S.C. 154(b) by 347 days.

This patent is subject to a terminal disclaimer.

(21) Appl. No.: 16/589,202

(22) Filed: Oct. 1, 2019

(65) Prior Publication Data
US 2020/0029526 A1 Jan. 30, 2020

Related U.S. Application Data (63) Continuation of application No. 15/465,932, filed on Mar. 22, 2017, now Pat. No. 10,426,130.
(Continued)

(51) Int. Cl.
A01K 1/03 (2006.01)
A01K 1/00 (2006.01)
A45C 5/06 (2006.01)
A45C 7/00 (2006.01)
A01K 1/02 (2006.01)
A45C 13/36 (2006.01)
A45C 3/06 (2006.01)
A45C 13/00 (2006.01)
(Continued)

(52) U.S. Cl.
CPC .......... *A01K 1/0035* (2013.01); *A01K 1/0064* (2013.01); *A01K 1/0254* (2013.01); *A01K 1/033* (2013.01); *A01K 1/034* (2013.01); *A45C 3/06* (2013.01); *A45C 5/06* (2013.01); *A45C 7/0077* (2013.01); *A45C 13/001* (2013.01); *A45C 13/004* (2013.01); *A45C 13/103* (2013.01); *A45C 13/36* (2013.01); *A45F 3/02* (2013.01);
(Continued)

(58) Field of Classification Search
CPC ........ A01K 1/0035; A01K 1/03; A01K 1/033; A01K 1/034; A01K 1/035
USPC ....... 119/482, 496–501; 383/121–126, 121.1
See application file for complete search history.

(56) References Cited

U.S. PATENT DOCUMENTS 3,850,144 A * 11/1974 Springer .............. A01K 1/0254
119/497
5,170,745 A * 12/1992 Burdette, Jr. ........ A01K 1/0254
119/497
(Continued)

FOREIGN PATENT DOCUMENTS

WO WO2005112612 12/2005

OTHER PUBLICATIONS

International Search Report and Written Opinion of the International Searching Authority for PCT application No. PCT/US2017/023550 dated May 31, 2017.
(Continued)

*Primary Examiner* — David J Parsley (57) ABSTRACT

A collapsible pet carrier includes: an interior space defined between opposing side walls, opposing end walls, a bottom wall, and a top wall. One of the walls may be opened to allow access to the interior space. An expandable rigid board is located at least partially within one the walls. In an expanded configuration of the pet carrier the board is located substantially along a length of one of the walls to provide support to the collapsible pet carrier when the collapsible pet carrier is expanded. In a collapsed configuration of the pet carrier the board extends along less than half of the length of one of the walls to allow the pet carrier to be folded along one of the opposing side walls, opposing end walls, bottom wall, and top wall.

8 Claims, 14 Drawing Sheets

Related U.S. Application Data (60) Provisional application No. 62/311,549, filed on Mar. 22, 2016.

(51) Int. Cl.
  *A45C 13/10* (2006.01)
  *A45F 3/02* (2006.01)
  *A45C 3/00* (2006.01)
  *A45F 3/00* (2006.01)

(52) U.S. Cl.
  CPC .. *A45C 2003/002* (2013.01); *A45C 2003/008* (2013.01); *A45F 2003/003* (2013.01)

(56) References Cited

U.S. PATENT DOCUMENTS

| | | |
|---|---|---|
| 5,603,573 A | 2/1997 | Mercier et al. |
| 5,671,831 A | 9/1997 | Chiu |
| 5,988,878 A * | 11/1999 | Simonett ............ B62J 9/00 383/119 |
| 6,394,036 B2 * | 5/2002 | Burns ............ A01K 1/0254 119/497 |
| 7,073,462 B1 | 7/2006 | Layman |
| 9,681,641 B2 * | 6/2017 | Lau ............ A01K 1/0254 |
| 2004/0194723 A1 | 10/2004 | Farmer et al. |
| 2005/0238261 A1 | 10/2005 | Godshaw |
| 2007/0151895 A1 * | 7/2007 | Patterson ............ A45C 11/00 206/581 |
| 2008/0072837 A1 | 3/2008 | Redzisz et al. |
| 2010/0126427 A1 | 5/2010 | McGrade |
| 2012/0033902 A1 * | 2/2012 | Sabounjian ............ B65D 81/203 383/119 |

OTHER PUBLICATIONS

Supplemental Search Report of the European Patent Office for European Patent Application No. 17771044.9 dated Oct. 18, 2019.

\* cited by examiner

COLLAPSIBLE PET CARRIER

CROSS-REFERENCE TO RELATED APPLICATION(S)

This application claims priority to and is a continuation of U.S. patent application Ser. No. 15/465,932 for a Collapsible Pet Carrier filed on Mar. 22, 2017, which claims priority to and is a non-provisional of U.S. Provisional Patent Application No. 62/311,549 for a Collapsible Pet Carrier filed on Mar. 22, 2016, to Laura Torres, the contents of which are incorporated herein by reference in their entireties.

FIELD

The present disclosure relates to a carrier for transporting animals. More particularly, the present disclosure relates to a collapsible pet carrier that can, for example, potentially fit into a pocket of a user when not in use.

BACKGROUND

The discussion in this section is intended to introduce the reader to various aspects of art that may be related to various aspects of the structure and techniques of the present invention, which are described below. This discussion is believed to be helpful to facilitate a better understanding of the various aspects of the present disclosure, and these statements are not an admission of prior art.

Pet carriers have been in use for many years. Many different types of pet carriers, such as cages and bags, have been used to transport pets, such as dogs and cats. However, these pet carriers are either both heavy and difficult to transport or are both light and structurally unstable. Furthermore, these pet carriers tend to be uncomfortable for the pets and do not provide proper ventilation or support. In addition, when they are not in use, these pet carriers occupy a large amount of space during storage or transport. Moreover, these pet carriers tend to have a simple design and functionality with few or no pockets designed for storing items or accessories for the pet and/or the pet owner.

SUMMARY

The above and other needs are met by a folding pet carrier. In a first aspect, a collapsible pet carrier includes: an interior space defined between opposing side walls, opposing end walls, a bottom wall, and a top wall, wherein at least one of the opposing side walls, opposing end walls, bottom wall, and top wall may be opened to allow access to the interior space; an expandable rigid board located at least partially within one of the opposing side walls, opposing end walls, bottom wall, and top wall. In an expanded configuration of the pet carrier the board is located substantially along a length of one of the opposing side walls, opposing end walls, bottom wall, and top wall to provide support to the collapsible pet carrier when the collapsible pet carrier is expanded. In a collapsed configuration of the pet carrier the board extends along less than half of the length of one of the opposing side walls, opposing end walls, bottom wall, and top wall to allow the pet carrier to be folded along one of the opposing side walls, opposing end walls, bottom wall, and top wall.

In one embodiment, the expandable rigid board is located at least partially within the bottom wall of the collapsible pet carrier. In another embodiment, the expandable rigid board comprising a first portion that is slidably associated with a second portion such that the board is expandable in length.

In yet another embodiment, the pet carrier further includes a mesh window formed on one of the opposing side walls, opposing end walls, bottom wall, and top wall. In one embodiment, the top wall further includes a cover movably attached over a top opening of the collapsible carrier.

In a second aspect, a collapsible pet carrier includes: an interior space defined between opposing side walls, opposing end walls, a bottom wall, and a top wall, wherein at least one of the opposing side walls, opposing end walls, bottom wall, and top wall may be opened to allow access to the interior space; an expandable rigid board comprising a first portion that is slidably associated with a second portion such that the board is expandable in length, the expandable rigid board located at least partially within one of the opposing side walls, opposing end walls, bottom wall, and top wall. In an expanded configuration of the pet carrier the board is located substantially along a length of one of the opposing side walls, opposing end walls, bottom wall, and top wall to provide support to the collapsible pet carrier when the collapsible pet carrier is expanded. In a collapsed configuration of the pet carrier the board extends along less than half of the length of one of the opposing side walls, opposing end walls, bottom wall, and top wall to allow the pet carrier to be folded along one of the opposing side walls, opposing end walls, bottom wall, and top wall.

In one embodiment, the expandable rigid board is located at least partially within the bottom wall of the collapsible pet carrier. In another embodiment, the pet carrier further includes a mesh window formed on one of the opposing side walls, opposing end walls, bottom wall, and top wall. In yet another embodiment, the top wall further includes a cover movably attached over a top opening of the collapsible carrier.

In a third aspect, a collapsible pet carrier includes: an interior space defined between opposing side walls, opposing end walls, a bottom wall, and a top wall, wherein at least one of the opposing side walls, opposing end walls, bottom wall, and top wall may be opened to allow access to the interior space; an expandable rigid board comprising a first portion that is slidably associated with a second portion such that the board is expandable in length, the expandable rigid board located at least partially within one of the opposing side walls, opposing end walls, bottom wall, and top wall. In an expanded configuration of the pet carrier the board is located substantially along a length of one of the opposing side walls, opposing end walls, bottom wall, and top wall to provide support to the collapsible pet carrier when the collapsible pet carrier is expanded. In a collapsed configuration of the pet carrier the board extends along less than half of the length of one of the opposing side walls, opposing end walls, bottom wall, and top wall to allow the pet carrier to be folded along one of the opposing side walls, opposing end walls, bottom wall, and top wall.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
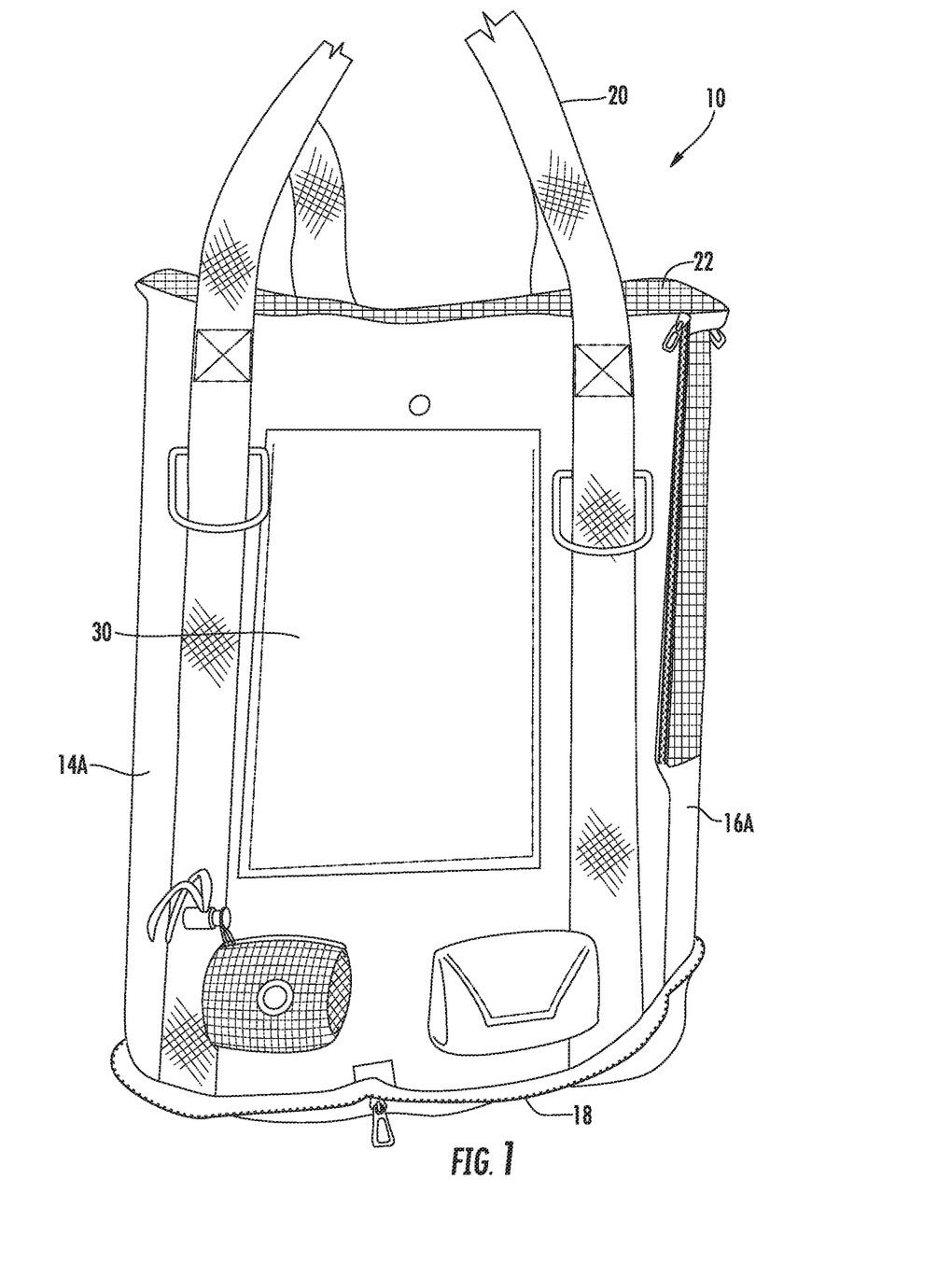
FIG. 1 shows a front view of one side wall of a pet carrier with a window cover folded down over a mesh window, according to an example embodiment of the present invention.
Figure 4:
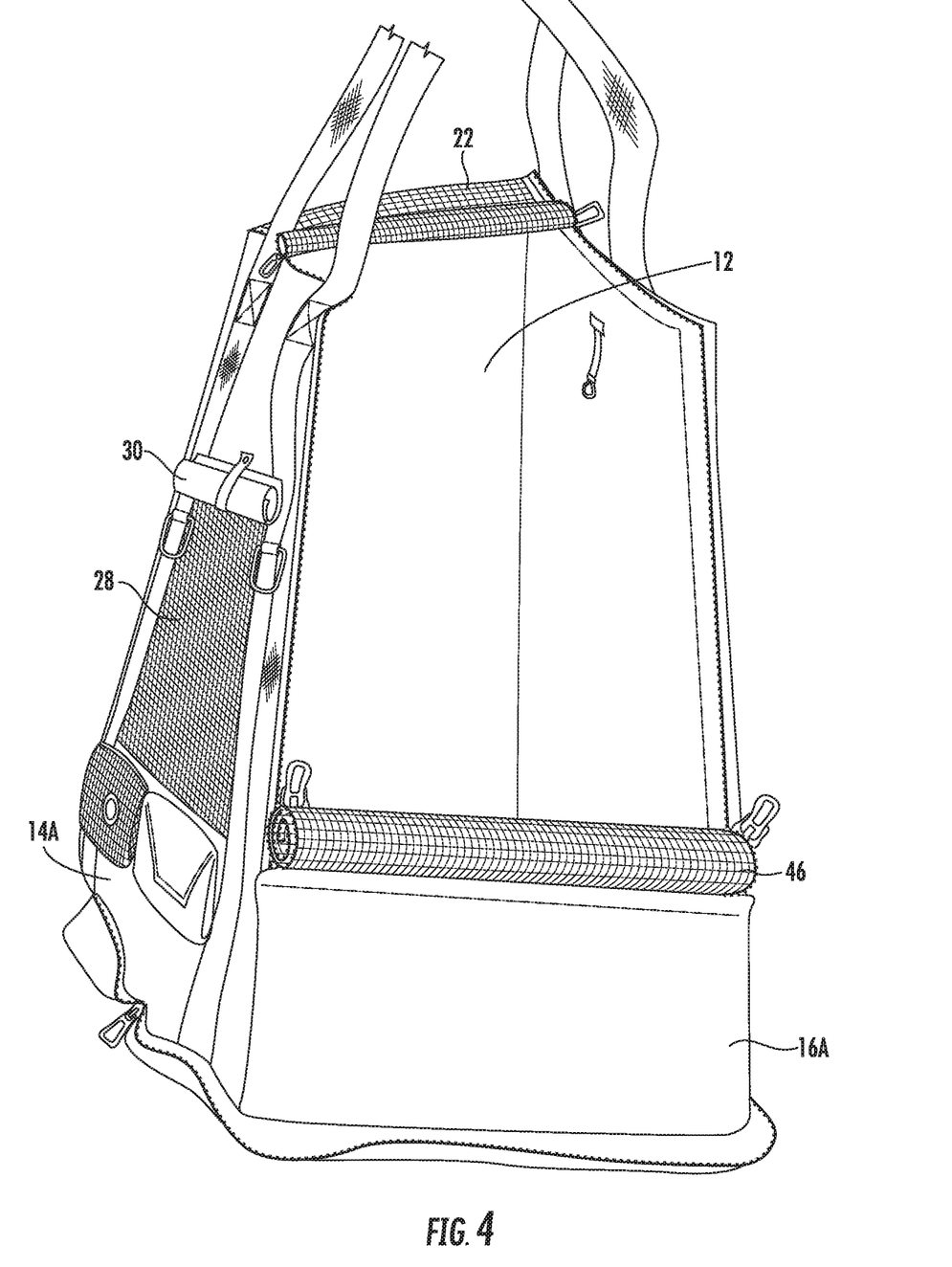
FIG. 4 shows the view of FIG. 3 but with the zipper on the end wall pulled down, according to an example embodiment of the present invention.

With reference to FIG. 1, a collapsible pet carrier 10 is provided that is configured to be placed into an expanded state and into a collapsed state. The pet carrier 10 includes a top opening and walls defining an interior space 12 (FIG. 4). The walls include two opposing side walls 14A and 14B, two opposing end walls 16A and 16B, and a bottom wall 18. In an alternative, instead of the two side walls 14A and 14B and two end walls 16A and 16B, fewer walls, which are curved, can be provided. For example, the side and end walls can be replaced with a single conical or cylindrical wrap-around wall, or two halves of such a configuration that are connected to each other at seams. In a further alternative example embodiment, the pet carrier 10 includes a material in the form of a sack that seamlessly flows from a bottom surface to a top circular edge.

The pet carrier further includes a handle(s) and/or strap(s) 20, e.g., shoulder straps, for carrying the pet carrier 10 and additionally for providing stability for the pet. The shoulder strap(s) 20 is secured to one of the side walls 14A and 14B or end walls 16A and 16B of the pet carrier 10, according to the embodiment in which the pet carrier includes side walls and end walls, or is secured to the curved wall(s) of the described alternative embodiments.

The pet carrier 10 includes a cover 22, such as a flap, by which the top opening can be covered. For example, FIGS. 1-4 and 7a show a zippered cover. In an example embodiment, the pet carrier also includes a removable inside liner.

Walls of the pet carrier 10 are preferably made of a canvas material, and, as will be discussed below, in an example embodiment contains various accessories attached to the canvas material. In an example embodiment, one or more of the accessories forms a respective portion of a respective one of the walls of the pet carrier, e.g., taking the place of the canvas material otherwise forming the respective wall. According to an alternative example embodiment, the walls of the pet carrier are instead made of a different material.

In an example embodiment of the present invention, the pet carrier 10 includes a mesh material releasably attached to an upper portion 24 (FIG. 3) of the two side walls 14A and 14B and the two end walls 16A and 16B, defining an upper portion of the interior space. The mesh material is attached via, for example, one or more zippers 26 and/or an adhesive. The zipper 26 can be a full length double zipper. In an example embodiment, the mesh material, when zippered, is configured to close and/or secure the interior space.

Figure 2:
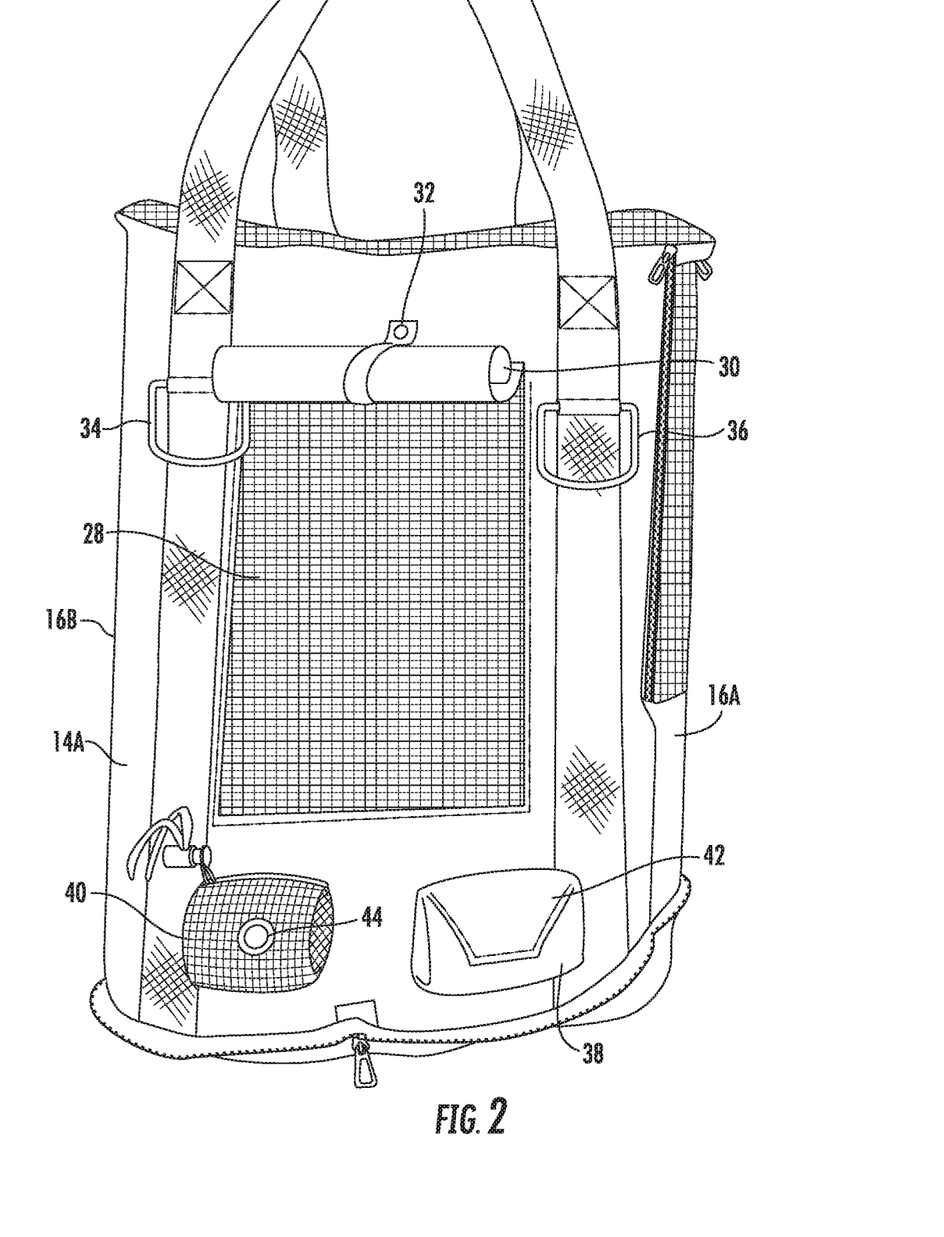
FIG. 2 shows the view of FIG. 1 but with the window cover folded up and revealing the mesh window.
Figure 3:
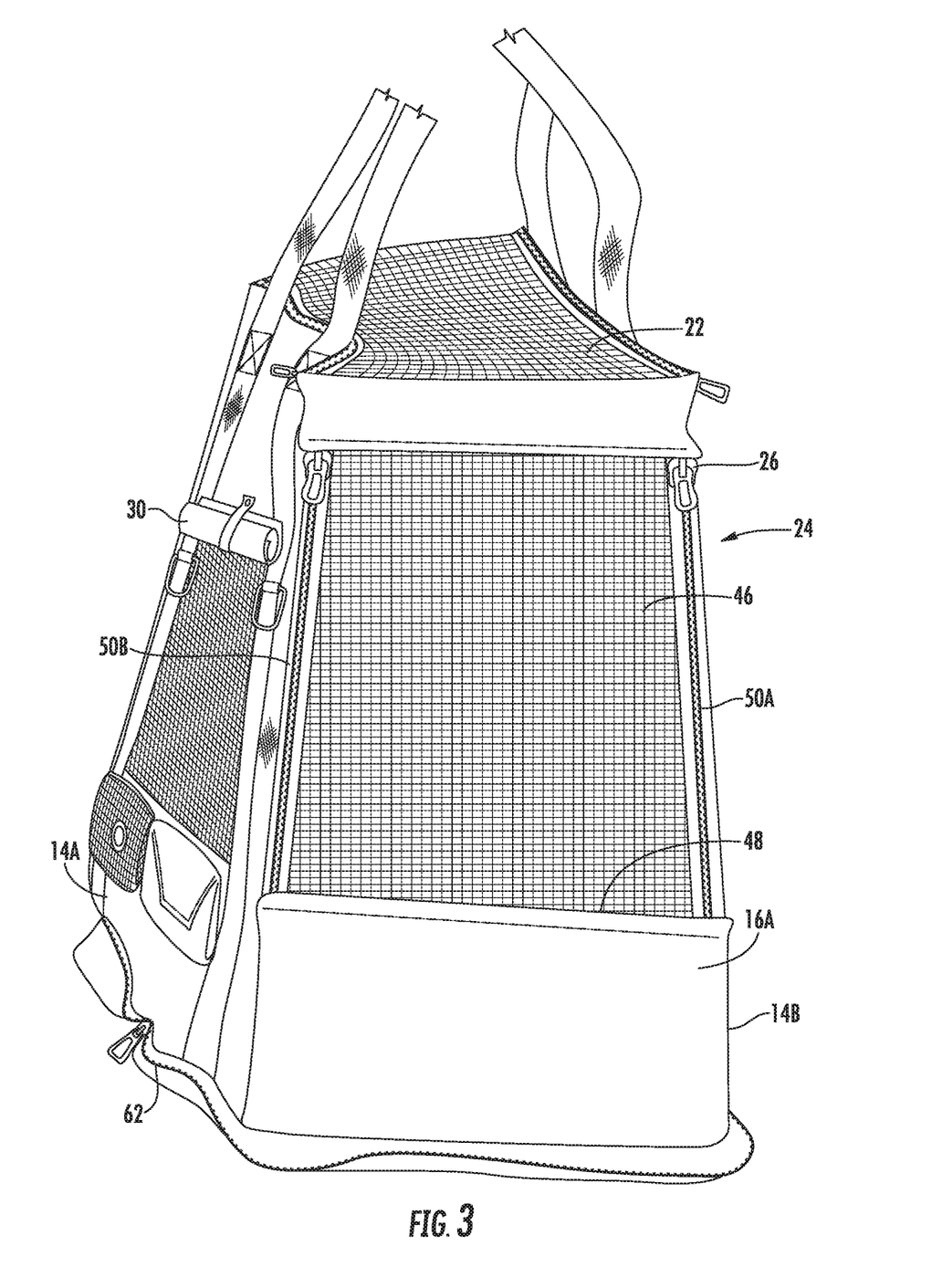
FIG. 3 shows a perspective view showing one end wall of the pet carrier with a zipper pulled up, and also showing, at the left, the side wall of FIGS. 1 and 2, according to an example embodiment of the present invention.

The pet carrier 10 may include, in one of the side walls 14A and 14B, a mesh/ventilation window 28, as shown in FIGS. 2-4 and 7. The mesh window 28 can be positioned approximately at the center of the side wall 14A and, in an example embodiment, is configured to open (FIG. 2) and close (FIG. 1). In an example embodiment, the remainder of the side wall 14A in which the window 28 is disposed is made of a solid material, e.g., canvas, cotton, and other suitable fabrics. In example embodiment, and as shown in FIGS. 1-4 and 7, a cover 30, such as an opaque fabric panel, e.g., of canvas, is attached to the side wall 14A above the mesh window, the cover 30 being capable of covering the mesh window 28 and acting as a privacy cover for the mesh window 28. In an example embodiment, a Velcro tab 32, as shown in FIG. 1, is attached to the side wall 14A above the cover 30, the tab 32 being capable of holding up the panel when the mesh window is in a non-privacy state, as shown in FIGS. 2 and 7. In one embodiment, the tab 32 may be formed of other suitable mechanisms, such as a snap as shown in FIG. 2.

Also, in an example embodiment and as shown in FIGS. 1-4 and 7, situated on the same side wall 14A are a first ring 34, e.g., a D-ring, configured to hold an item such as a leash, and a second ring 36, e.g., a D-ring, configured to hold an item, such as a collapsible water bowl. In an alternative example embodiment, one or both D-rings are situated on an adjacent end wall 16A or 16B, rather than on the side wall 14A. Also, in an example embodiment, situated on the same side wall is a pocket 38, such as the right pocket at a lower region of the side wall as shown in FIGS. 1-5 and 7, for storing miscellaneous items such as animal treats, and a pouch 40, such as the left pocket at the lower region of the side wall as shown in FIGS. 1-5 and 7, configured as a poop bag dispenser. The pocket 38 can be made of Velcro or other mechanisms for closing the pocket 38 and can include a flap 42 configured to open and close the pocket 38. The pouch 42 can have a small opening 44 sized so that, for example, only a single poop bag is dispensable by a user pulling on a bag that is partially protruding from the small opening 44. In the example embodiment, both the pocket 38 and the pouch 40 are disposed below the mesh window 28.

In an example embodiment of the present invention, one or both of the end walls 16A and 16B includes a second mesh window 46, e.g., as shown in FIGS. 1-4 and 7. In an example embodiment, a bottom 48 of the second mesh window 46 is fixedly attached to a lower region of the respective end wall 16A and side edges 50A and 50B are releasably attached to fixed edges of the respective end wall, e.g., by the one or more zippers 26. The zippers 26 extend along outer edges of the end wall 16A. The second mesh window 46 may comprise half or most of the end wall 16A, including the upper half of the end wall, while the lower region of the end wall 16A is made of a non-mesh material, e.g., of canvas, cotton, or other like fabric materials. In an example embodiment, the second mesh window 46 is configured to be opened by pulling the zippers 26 in a downward motion toward the bottom wall 18. In an example embodiment, the cover 22 is made of mesh material releasably attached to upper edges of one or more of the walls, and is configured to hang over a portion of the second mesh window 46. A pet may be able to extend its head outside the pet carrier 10 between the cover 22 and the second mesh window 46.

Figures 5A, 5B:
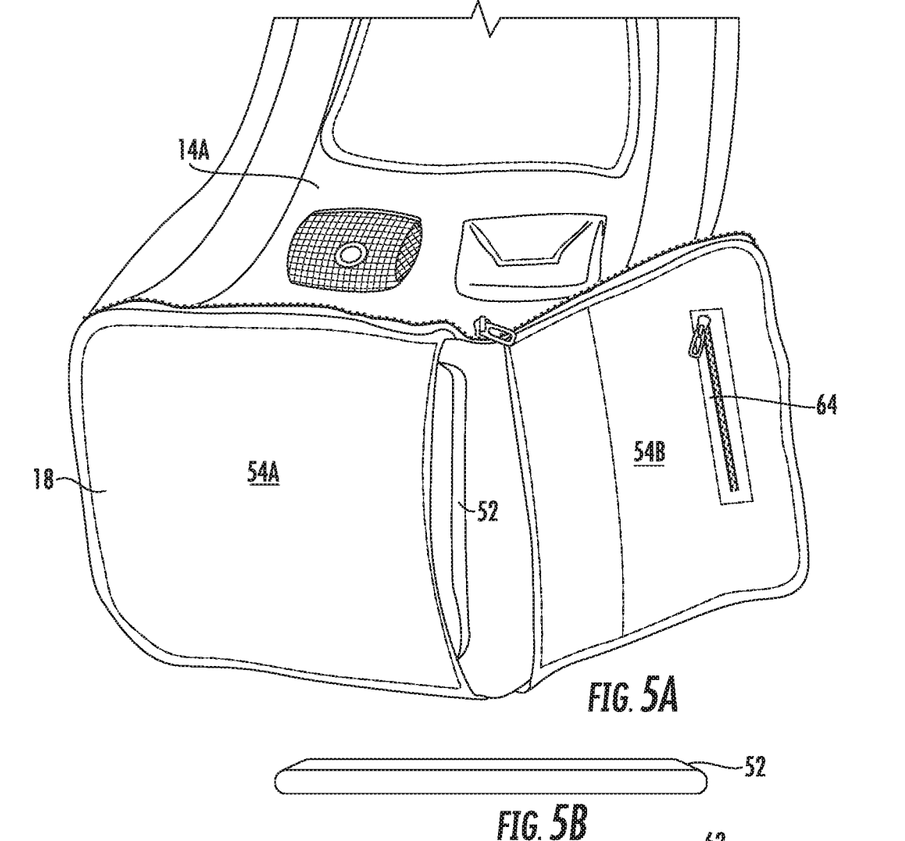
FIG. 5a shows a view of the bottom wall of the pet carrier in a partially collapsed state with a sheet/board contained in one pocket and with one side wall extending from the bottom wall, according to an example embodiment of the present invention.
FIG. 5b shows the sheet/board according to an example embodiment of the present invention.
Figure 5C:
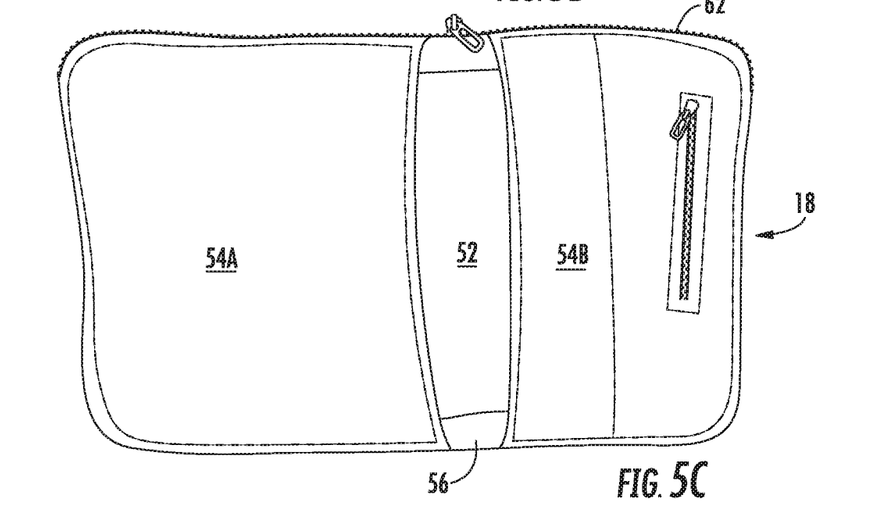
FIG. 5c shows a view of the bottom wall of the pet carrier extending into pockets of the pet carrier according to one embodiment of the present disclosure.
Figure 6:
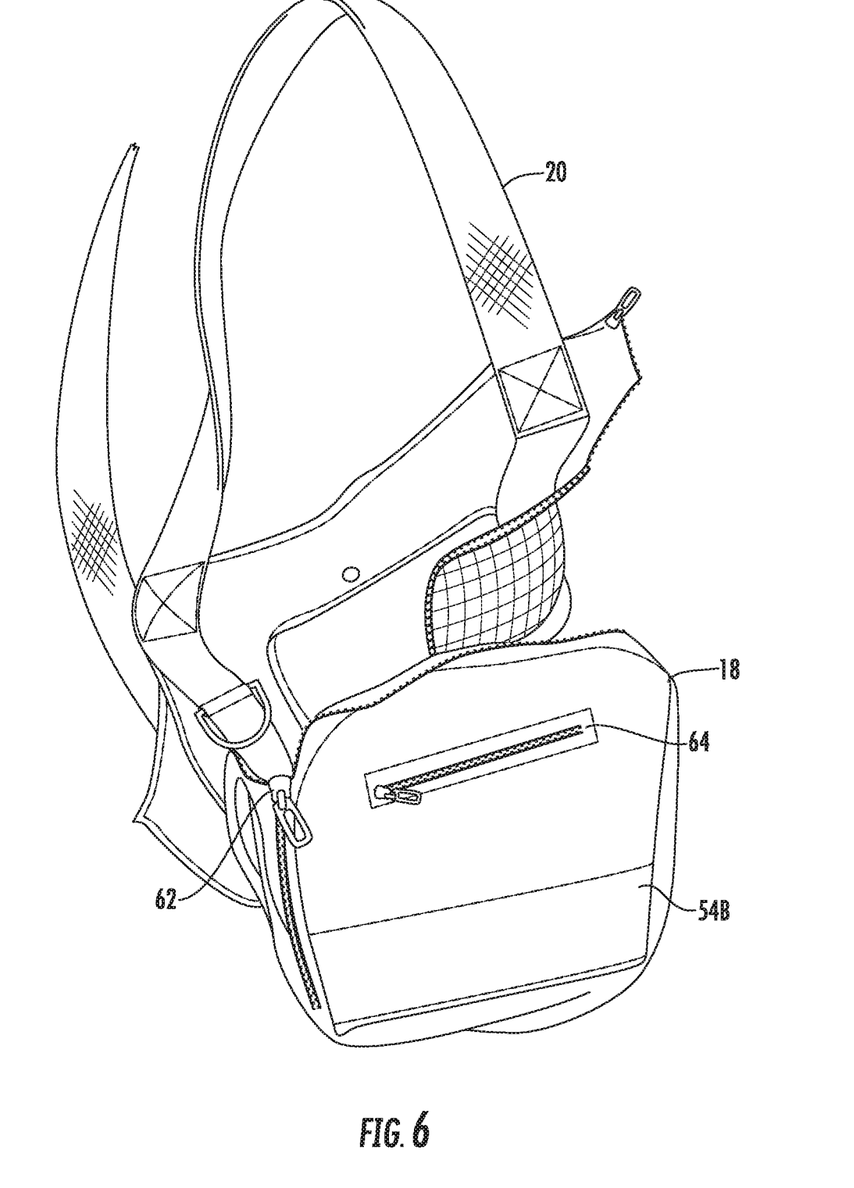
FIG. 6 shows a view of the upper portion of the pet carrier being partially folded into the interior space of the pet carrier, according to an example embodiment of the present invention.

The pet carrier 10 includes a firm sheet or board 52, e.g., as shown in FIG. 5b, and two opposing pockets 54A and 54B, to which access is provided by a slit 56, are configured to hold the sheet or board 52 therein. The sheet or board 52 is preferably made of vinyl, polymer, or other firm material, but the material can be any suitably appropriate material that can provide a sturdy base to stabilize the carrier 10 and support a pet within the carrier 10. In an example embodiment, the pockets 54A and 54B and the sheet or board 52 are sized so that the sheet or board 52 can fit entirely within each of at least one of the pockets 54A and 54B when the pet carrier 10 is in the collapsed state. For example, FIG. 5a shows the sheet or board 52 entirely within the pocket 54A to the left of the slit 56. In FIGS. 5a and 5c, the pocket 54B to the right of the slit 56 is not large enough to hold the entirety of the sheet or board 52 because the pocket 54B to the right is sized to accommodate the pocket 54B described above for insertion therein of money, credit cards, identification documents, and/or transit cards.

Figure 9:
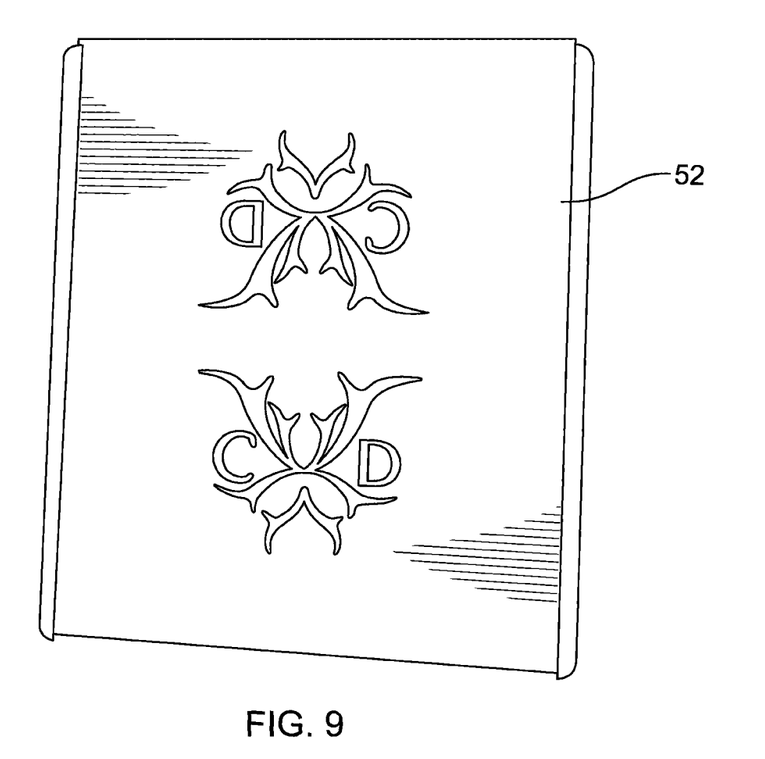
FIG. 9 shows an expandable board in a collapsed configuration according to one embodiment of the present disclosure.
Figure 10:
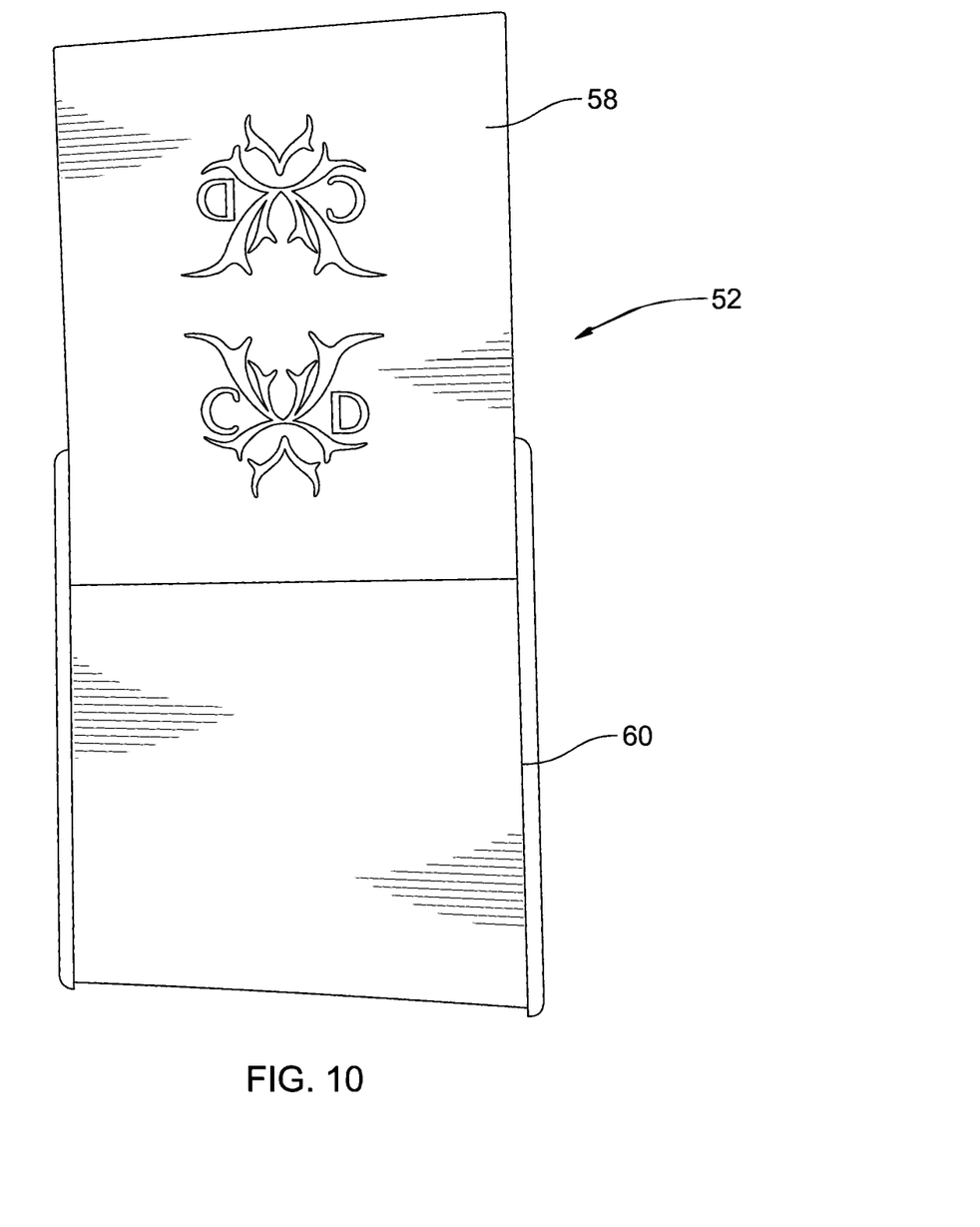
FIG. 10 shows an expandable board in an expanded configuration according to one embodiment of the present disclosure.
Figure 11:
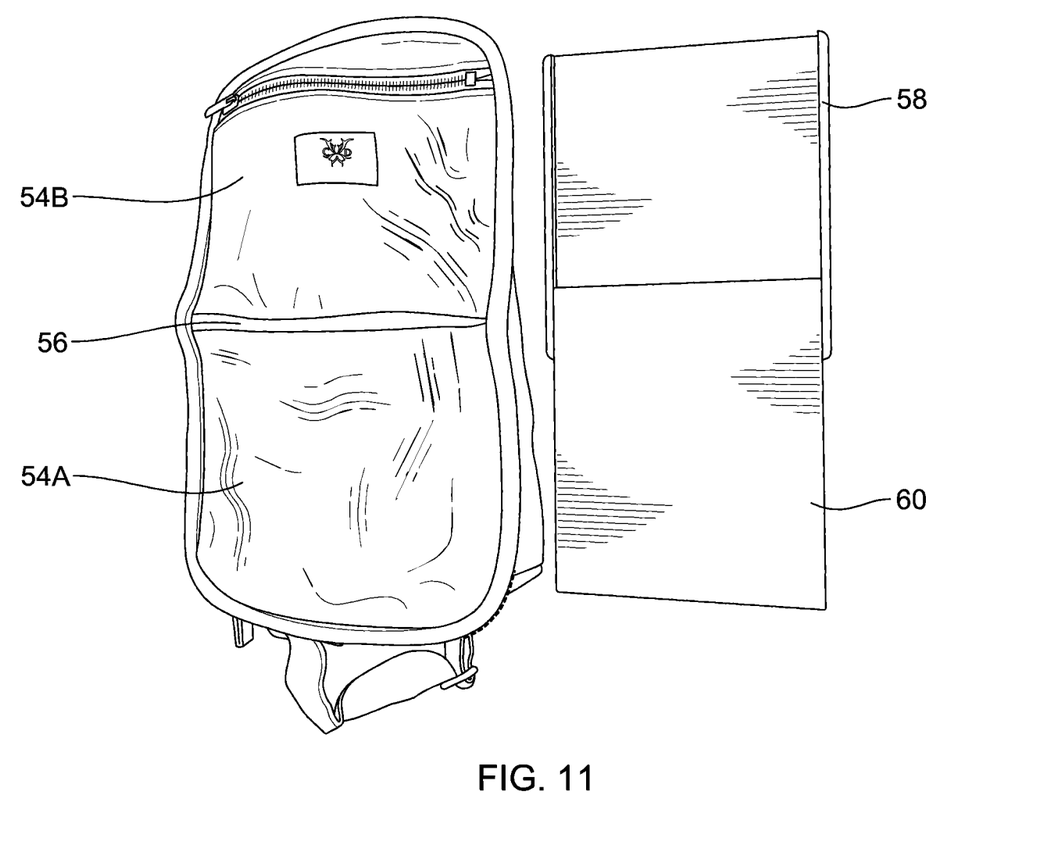
FIG. 11 shows an expandable board and pet carrier according to one embodiment of the present disclosure.
Figure 12:
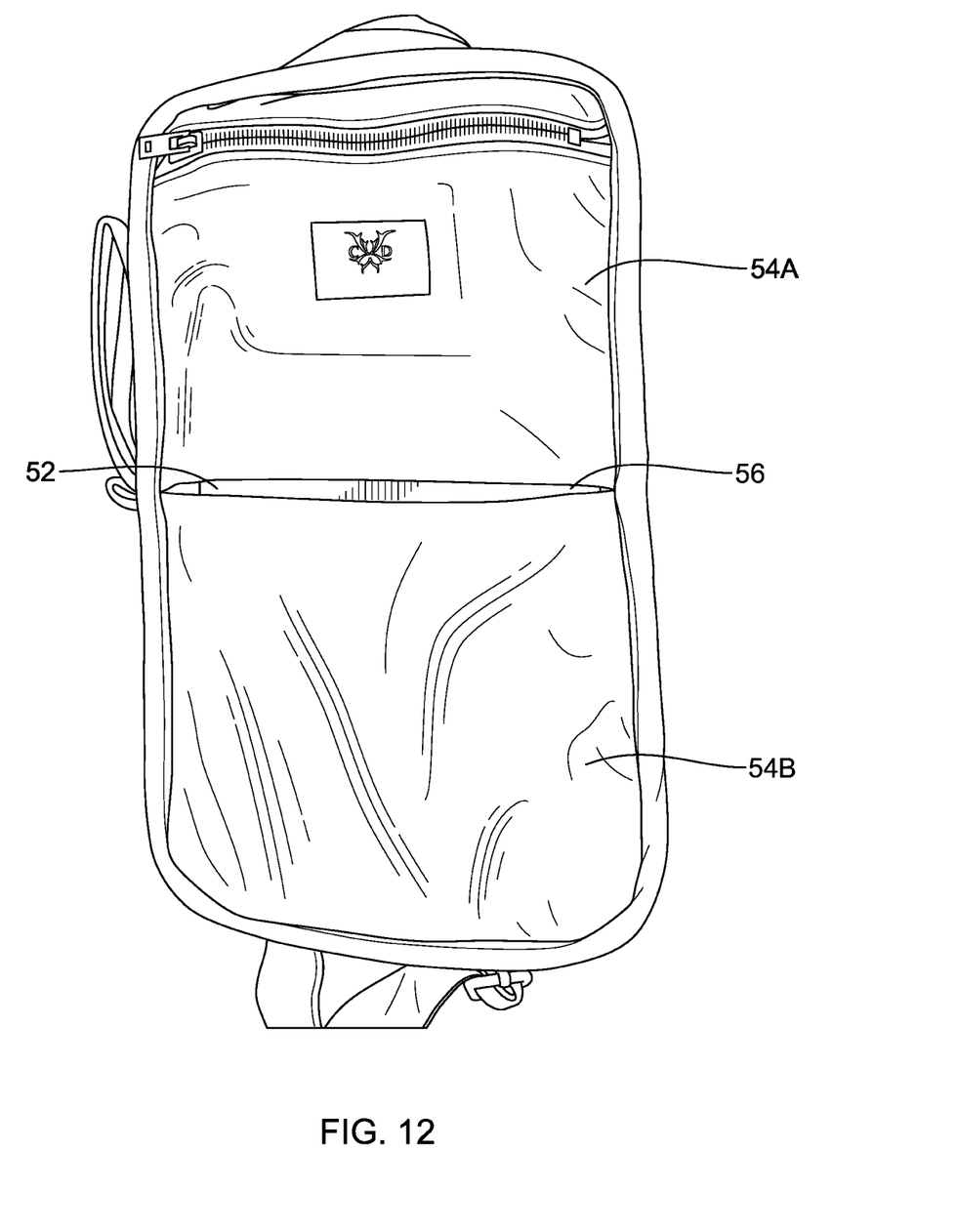
FIG. 12 shows an expandable pet carrier according to one embodiment of the present disclosure.

Referring to FIGS. 9-12, in one embodiment the firm sheet or board 52 is formed of a first portion 58 slidably associated with a second portion 60 such that the firm sheet or board 52 is extendable in length to be disposed within the pockets 54A and 54B. The first portion 58 preferably has a width that is narrower than the second portion 60 such that the first portion 58 may slide within the second portion 60 such that the firm sheet or board 52 is collapsed, as shown in FIG. 9. The first portion 58 may be slid relative to the second portion 60 to extend and elongate a shape of the firm sheet or board 52, as shown in FIG. 10. When the firm sheet or board 52 is in a collapsed configuration, the firm sheet or board 52 is preferably shaped to fit within the pocket 54A. In the extended configuration, the firm sheet or board 52 extends substantially completely into both the pockets 54A and 54B and across the slit 56, as shown in FIG. 12. The pockets of the embodiment of FIGS. 9-12 extend to ends of the bottom wall 18 such that when the firm sheet or board 52 is fully extended, the firm sheet or board 52 extends across substantially an entire length of the bottom wall 18.

In an example embodiment of the present disclosure, the bottom wall 18 has an interior portion and an exterior portion. FIGS. 5a and 5c show an example of the exterior portion. The exterior portion includes a zipper(s) 62 along a rim of the bottom wall 18. In an example embodiment, the exterior portion includes a pocket 64, e.g., zippered as shown in FIGS. 5a and 5c, in which a user can insert, for example, money, credit cards, identification documents, and/or transit cards. The exterior portion can also have thereon a logo or other design element. In an example embodiment, as shown in FIGS. 5a and 5c, the exterior portion also includes the slit 56 disposed at a center region thereof for access to the two opposing pockets 54A and 54B, one at each side of the slit 56.

The pet carrier 10 is configured for the sheet or board 52 to be slid from the position shown in FIG. 5a to the position shown in FIG. 5c, in which the sheet or board 52 extends between the two opposing pockets 54A and 54B accessible via the slit 56, so that the sheet or board 52 keeps the pet carrier 10 in the expanded state with the bottom wall 18 thereby providing a rigid and stable carrying surface on which a pet can stand or sit.

For the pet carrier 10 to be in the expanded state, e.g., when a pet is to be housed in the interior space, the sheet/board 52 is inserted at least partially into each of the pockets 54A and 54B and traverses the slit 56. For the pet carrier 10 to be in the collapsed state, e.g., when the pet carrier is not in use and is to be folded over and collapsed, the sheet/board 52 can be placed entirely into one of the pockets 54A or 54B (or mostly in one of the pocket, but without extending into the other one of the pockets) or can be removed altogether from the bottom wall 18.

Figures 7A, 7B:
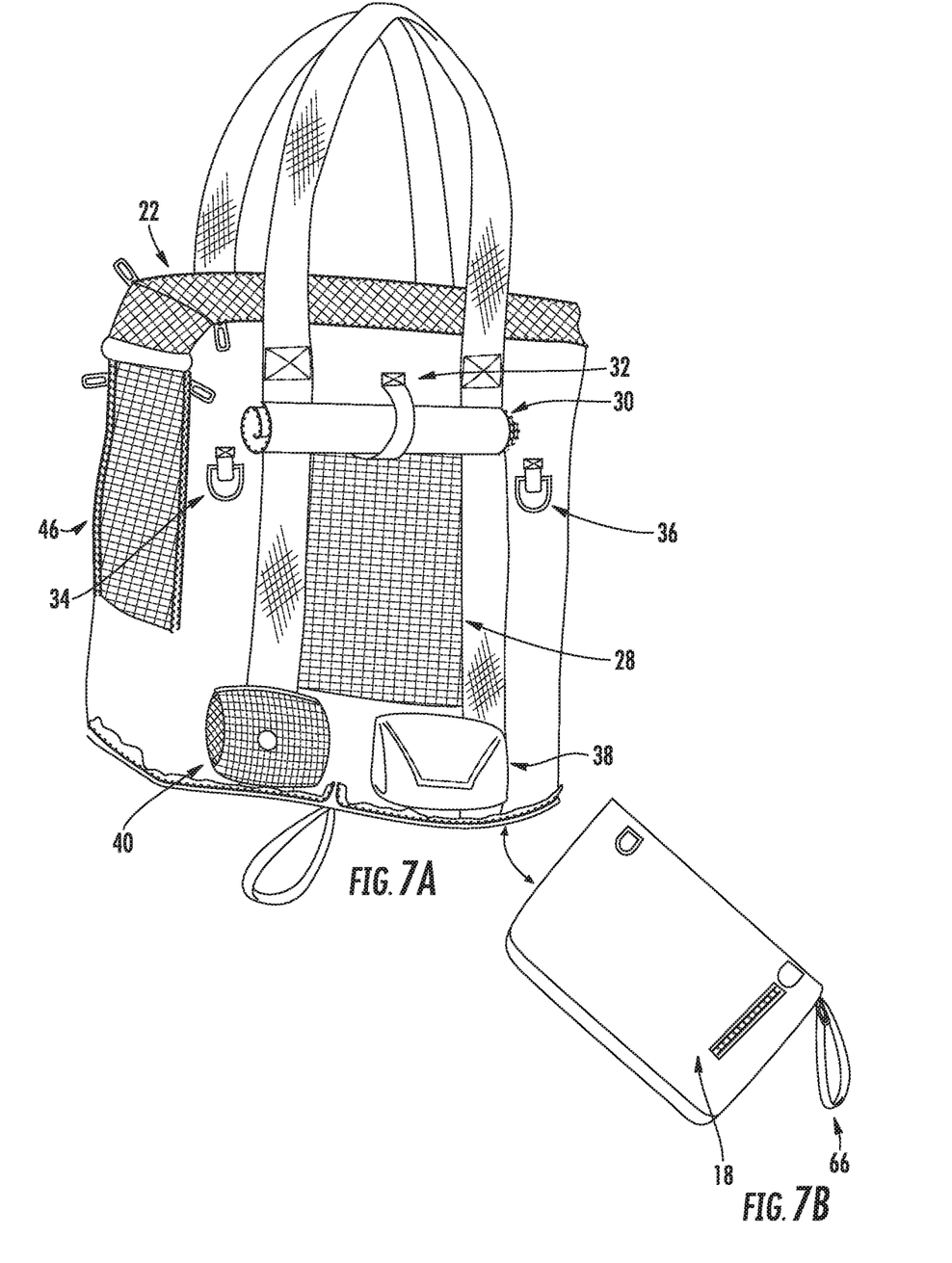
FIG. 7a shows a perspective view of the pet carrier in the expanded state, according to an example embodiment of the present invention.
FIG. 7b shows the pet carrier in the collapsed and closed state, according to an example embodiment of the present invention.
Figure 8:
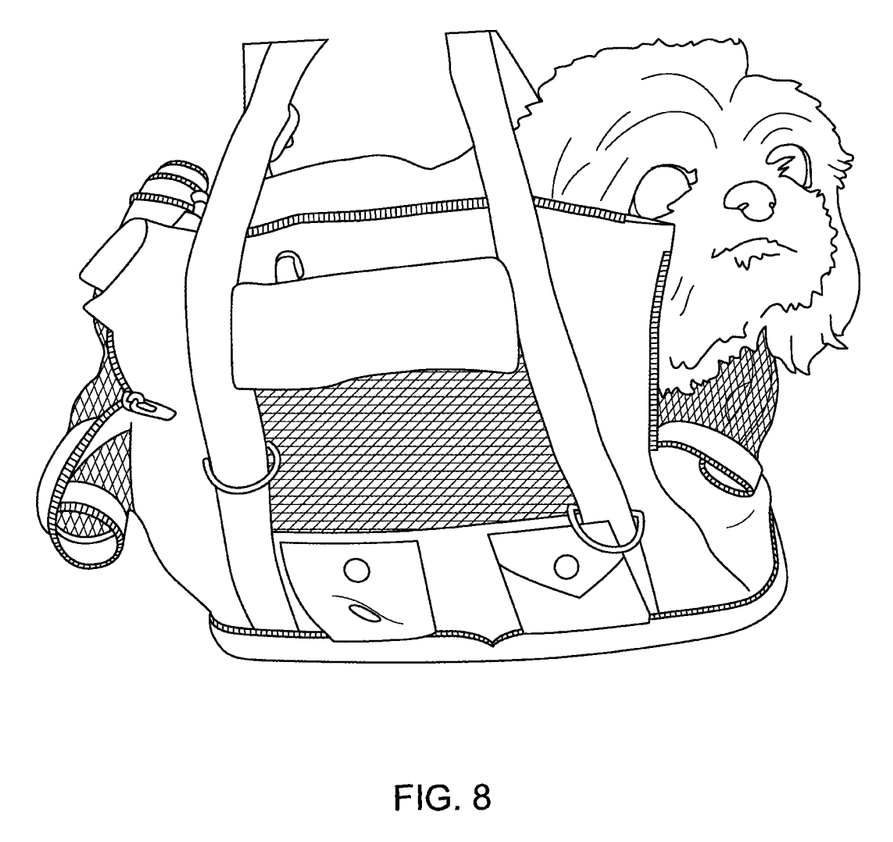
FIG. 8 shows four different views of an example embodiment of a collapsible pet carrier in accordance with the present invention.
Figure 13:
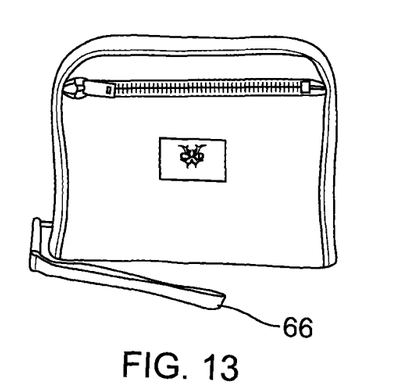
FIG. 13 shows an expandable pet carrier in a collapsed configuration according to one embodiment of the present disclosure.
Figure 14:
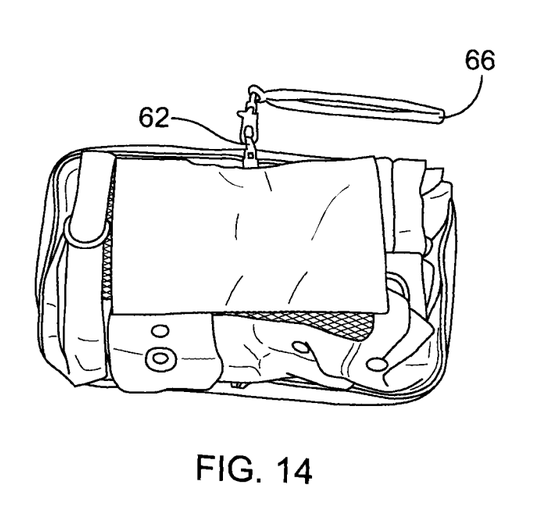
FIG. 14 shows an expandable pet carrier with portions of the carrier folded towards the bottom wall according to one embodiment of the present disclosure.
Figure 15:
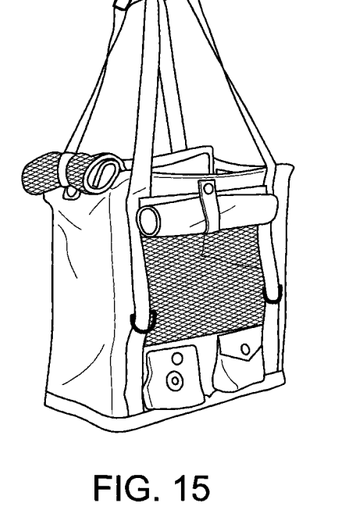
FIGS. 15 and 16 show an expandable pet carrier according to one embodiment of the present disclosure.
Figure 16:
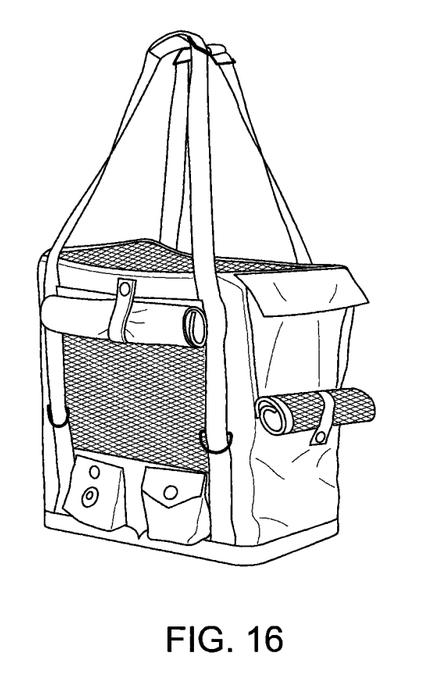

When the pet carrier 10 is in the collapsed state, the two side walls 14A and 14B, two end walls 16A and 16B, cover 22, strap 20, and any other accessory attached thereto can be folded into the interior space 12 and toward the bottom wall 18, as shown in FIG. 14. After the folding, the zipper(s) 62 along the rim of the bottom wall can be pulled to connect two halves of the exterior portion of the bottom wall 18 so that the pet carrier takes the form of a clutch/wallet size pouch, e.g., as shown in FIGS. 7b and 13. In an example embodiment, the pouch includes a removable wristlet strap 66, as well as D-rings for attaching shoulder straps.

The pet carrier 10 of the present disclosure is lightweight, and is used for transporting small pets (e.g., under 20 lbs) within transit systems, protecting the pet within stores and buildings, and for veterinary visits. Further, the pet carrier 10 is readily convertible between a small pouch and an expanded pet carrier such that a user may easily carry the pet carrier 10 when a pet is not contained in the carrier, and such that the pet carrier may readily accept a pet within the carrier 10 when desired by a user.

The foregoing description of preferred embodiments of the present disclosure has been presented for purposes of illustration and description. Modifications or variations are possible in light of the above teachings. The embodiments are chosen and described to provide the best illustrations of the principles of the disclosure and its practical application, and to enable one of ordinary skill in the art to utilize the concepts revealed in the disclosure in various embodiments and with various modifications. All such modifications and variations are within the scope of the disclosure as determined by the appended claims when interpreted in accordance with the breadth to which they are fairly, legally, and equitably entitled.

What is claimed is:

1. A collapsible pet carrier comprising:
   an interior space defined between opposing side walls, opposing end walls, a bottom wall, and a top wall, wherein the opposing side walls, opposing end walls, the bottom wall, and the top wall enclose the interior space and at least one of the opposing side walls, opposing end walls, bottom wall, and top wall may be opened to allow access to the interior space;
   at least one pocket formed on an outside of the bottom wall, the at least one pocket extending along the bottom wall;
   a rigid board located at least partially within the bottom wall to support a pet within the pet carrier thereon, wherein the rigid board is adjustable in length such that the rigid board is extendable along a length of the bottom wall;
   wherein in an expanded configuration of the pet carrier the rigid board is in an extended position and is located within the at least one pocket formed on the outside of the bottom wall to provide support to the bottom wall of the collapsible pet carrier when the collapsible pet carrier is expanded; and
   wherein in a collapsed configuration of the pet carrier the rigid board is in a retracted position such that the rigid board fits within the pocket and extends along less than substantially half of the length of one of the at least one pocket of the bottom wall to allow opposing ends of the bottom wall of the pet carrier to be folded towards one another while the rigid board is on the collapsible pet carrier to allow the pet carrier to collapse.

2. The collapsible pet carrier of claim 1, the expandable rigid board comprising a first portion that is slidably associated with a second portion such that the board is expandable in length.

3. The collapsible pet carrier of claim 1, further comprising a mesh window formed on one of the opposing side walls, opposing end walls, bottom wall, and top wall.

4. The collapsible pet carrier of claim 1, the top wall further comprising a cover movably attached over a top opening of the collapsible carrier.

5. A collapsible pet carrier comprising:
   an interior space defined between opposing side walls, opposing end walls, a bottom wall, and a top wall, wherein the opposing side walls, opposing end walls, the bottom wall, and the top wall enclose the interior space and at least one of the opposing side walls, opposing end walls, bottom wall, and top wall may be opened to allow access to the interior space;
   an expandable rigid board comprising a first portion that is slidably associated with a second portion such that the board is expandable in length, the expandable rigid board located at least partially within at least one pocket of the bottom wall, the pocket located on an outside of the bottom wall;
   wherein in an expanded configuration of the pet carrier the rigid board is in an extended position and is located within the at least one pocket formed on the outside of the bottom wall bottom wall to provide support to the bottom wall of the collapsible pet carrier when the collapsible pet carrier is expanded; and
   wherein in a collapsed configuration of the pet carrier the rigid board is in a retracted position such that the rigid board fits within the pocket and extends along less than substantially half of the length of one of the at least one pocket of the bottom wall to allow opposing ends of the bottom wall of the pet carrier to be folded towards one another while the rigid board is on the collapsible pet carrier to allow the pet carrier to collapse.

6. The collapsible pet carrier of claim 5, further comprising a mesh window formed on one of the opposing side walls, opposing end walls, bottom wall, and top wall.

7. The collapsible pet carrier of claim 5, the top wall further comprising a cover movably attached over a top opening of the collapsible carrier.

8. A collapsible pet carrier comprising:
   an interior space defined between opposing side walls, opposing end walls, a bottom wall, and a top wall, wherein the opposing side walls, opposing end walls, the bottom wall, and the top wall enclose the interior space and at least one of the opposing side walls, opposing end walls, bottom wall, and top wall may be opened to allow access to the interior space;
   at least one pocket formed on an outside of the bottom wall, the at least one pocket extending along the bottom wall;
   a cover movably attached over a top opening of the collapsible carrier;
   rigid board located at least partially within the bottom wall to support a pet within the pet carrier thereon, wherein the rigid board is extendable along a length of the bottom wall;
   a rigid board comprising a first portion that is slidably associated with a second portion such that the board is expandable in length, the expandable rigid board located at least partially within the pocket of the bottom wall;
   wherein in an expanded configuration of the pet carrier the rigid board is in an extended position and is located within the at least one pocket formed on the outside of the bottom wall to provide support to the bottom wall of the collapsible pet carrier when the collapsible pet carrier is expanded; and
   wherein in a collapsed configuration of the pet carrier the rigid board is in a retracted position such that the rigid board fits within the pocket and extends along less than substantially half of the length of one of the at least one pocket of the bottom wall to allow opposing ends of the bottom wall of the pet carrier to be folded towards one another while the rigid board is on the collapsible pet carrier to allow the pet carrier to collapse.

* * * * *